US008635036B2

(12) United States Patent
Pamulaparthy et al.

(10) Patent No.: US 8,635,036 B2
(45) Date of Patent: Jan. 21, 2014

(54) SYSTEMS, METHODS, AND APPARATUS FOR PROVIDING ENERGY MANAGEMENT UTILIZING A POWER METER

(75) Inventors: BalaKrishna Pamulaparthy, Andhra Pradesh (IN); K.V.S. Manoj Kumar Vadali, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 12/984,260

(22) Filed: Jan. 4, 2011

(65) Prior Publication Data

US 2012/0173032 A1    Jul. 5, 2012

(51) Int. Cl.
| | |
|---|---|
| G01R 21/00 | (2006.01) |
| G01R 21/06 | (2006.01) |
| G05B 15/00 | (2006.01) |
| G08B 23/00 | (2006.01) |
| G08C 15/06 | (2006.01) |

(52) U.S. Cl.
USPC ............................ 702/62; 700/83; 340/870.02

(58) Field of Classification Search
USPC ............ 700/17, 83, 286, 295; 702/57, 60–62; 340/870.01–870.03
See application file for complete search history.

(56) References Cited

U.S. PATENT DOCUMENTS

| | | | |
|---|---|---|---|
| 6,933,857 B2* | 8/2005 | Foote ....................... | 340/870.02 |
| 7,053,790 B2* | 5/2006 | Jang et al. ................ | 340/870.02 |
| 7,248,180 B2* | 7/2007 | Hattori ..................... | 340/870.02 |
| 7,886,166 B2* | 2/2011 | Shnekendorf et al. ........ | 713/310 |
| 7,953,519 B2* | 5/2011 | Hamilton et al. ............. | 700/295 |
| 8,072,348 B2* | 12/2011 | Rogai ....................... | 340/870.02 |
| 8,305,231 B2* | 11/2012 | Fujii et al. ................ | 340/870.02 |
| 2001/0010032 A1* | 7/2001 | Ehlers et al. .................... | 702/62 |
| 2005/0086341 A1 | 4/2005 | Enga et al. | |
| 2005/0212688 A1* | 9/2005 | Chung ..................... | 340/870.02 |
| 2007/0067119 A1* | 3/2007 | Loewen et al. ................. | 702/57 |
| 2008/0088476 A1 | 4/2008 | Wang et al. | |
| 2008/0158008 A1 | 7/2008 | Kagan et al. | |
| 2010/0238003 A1 | 9/2010 | Chan et al. | |
| 2012/0078547 A1* | 3/2012 | Murdoch ........................ | 702/62 |
| 2012/0116602 A1* | 5/2012 | Vaswani et al. ............... | 700/295 |

FOREIGN PATENT DOCUMENTS

WO    99/65192 A1    12/1999

OTHER PUBLICATIONS

Search Report issued in connection with EP Patent Application No. 11195343.6, Apr. 20, 2012.

* cited by examiner

*Primary Examiner* — Crystal J Barnes-Bullock (74) *Attorney, Agent, or Firm* — Sutherland Asbill & Brennan LLP (57) ABSTRACT

Systems, methods, and apparatus for providing energy management utilizing a power meter are provided. A request for a graphical user interface may be received by a power meter in communication with an external device. The requested graphical user interface may be associated with at least one of (i) operation of the power meter or (ii) provision of electrical power to one or more loads. Based at least in part on the received request, information associated with the graphical user interface may be generated by the power meter and communicated to the external device.

16 Claims, 5 Drawing Sheets

SYSTEMS, METHODS, AND APPARATUS FOR PROVIDING ENERGY MANAGEMENT UTILIZING A POWER METER

FIELD OF THE INVENTION

Embodiments of the invention relate generally to power meters, and more specifically to systems, methods, and apparatus for providing energy management utilizing a power meter.

BACKGROUND OF THE INVENTION

The majority of total retail electrical power sales result from residential and commercial sales. Additionally, the demand and cost for producing electricity vary significantly throughout the year and within any given day. Accordingly, electricity usage during hours of peak demand will cost more for customers of utility providers. Recently, customers have begun to seek ways in which power cost savings may be achieved. By shifting some of the electricity demand from peak hours to non-peak hours, it may be possible to achieve relatively significant cost savings.

One potential solution for encouraging customers to monitor and shift electricity demand is to provide customers with increased information associated with electricity usage. Accordingly, systems, methods, and apparatus for providing energy management utilizing a smart power meter are desirable.

BRIEF DESCRIPTION OF THE INVENTION

Some or all of the above needs and/or problems may be addressed by certain embodiments of the invention. Embodiments of the invention may include systems, methods, and apparatus for providing energy management utilizing a power meter. According to one embodiment of the invention, there is disclosed a method for providing energy management services utilizing a power meter. A request for a graphical user interface may be received by a power meter in communication with an external device. The requested graphical user interface may be associated with at least one of (i) operation of the power meter or (ii) provision of electrical power to one or more loads. Based at least in part on the received request, information associated with the graphical user interface may be generated by the power meter and communicated to the external device.

According to another embodiment of the invention, there is disclosed a power meter that provides energy management services. The power meter may include at least one memory and at least one processor. The at least one memory may be configured to store computer-executable instructions. The at least one processor may be configured to access the at least one memory and execute the computer-executable instructions to (i) receive, from an external device, a request for a graphical user interface associated with at least one of (a) operation of the power meter or (b) provision of electrical power to one or more loads; (ii) generate, based at least in part on the received request, information associated with the graphical user interface; and (iii) direct communication of the generated information to the external device.

Additional systems, methods, apparatus, features, and aspects are realized through the techniques of various embodiments of the invention. Other embodiments and aspects of the invention are described in detail herein and are considered a part of the claimed inventions. Other embodiments and aspects can be understood with reference to the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the inventions may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatus for providing energy management services utilizing a power meter. In certain embodiments, a power meter may be provided, and the power meter may facilitate communication with one or more user devices, such as personal computers and/or mobile devices. For example, the power meter may host a network session with a user device. During a hosted network session, the power meter may communicate information associated with one or more graphical user interfaces (e.g., Web sites, etc.) to the user device. In this regard, operations information associated with the power meter and/or devices in communication with the power meter may be provided to a user. Additionally, various user commands associated with the operation of the power meter and/or connected devices may be received and processed. Accordingly, a wide variety of energy management solutions may be provided to a user by the power meter.

In certain embodiments, a power meter may be a suitable processor-driven device configured to execute suitable energy management software that provides an interface between the power meter and one or more users. For example, the power meter may include at least one memory configured to store computer-executable instructions and at least one processor configured to execute the computer-executable instructions to provide energy management services. In certain embodiments, a request for a graphical user interface, such as a Web site, may be received from an external device (e.g., an external user device) and processed by the power meter. For example, the power meter may include at least one suitable communications interface that facilitates receipt of the request, such as a communications card or board (e.g., a Silver Spring Network board, etc.) that facilitates network communication. In response to the received request, the at least one processor may generate information associated with the requested graphical user interface and direct communication of the generated information to the requesting device. A wide variety of different types of graphical user interfaces may be provided by the power meter, such as a graphical user interface that facilitates display of operating information associated with the power meter and/or other devices associated with the power meter and/or a graphical user interface that facilitate the receipt of user commands to control operations of the power meter and/or devices associated with the power meter.

In accordance with various embodiments of the invention, the power meter may collect and/or determine a wide variety of information associated with energy management and/or operation of the power meter and/or any number of devices associated with the power meter. Examples of information that may be collected and/or determined include, but are not limited to, an age of the power meter, identification information for the power meter (e.g., name plate marking information, manufacturing information, serial number information, a meter identification number, etc.), information associated with one or more environmental conditions (e.g., temperature, humidity, moisture content, etc.), status information for one or more buttons (e.g., a display scroll button, a test button, an arm button, etc.) associated with the power meter, energy demand information, energy pricing information, phase loading information associated with the power meter (e.g., phase voltage, phase current, etc.), phase loading trends and/or charts, electrical load profile information, time of use information, prepaid metering data information, status information for one or more load control relays (e.g., internal relays and/or external relays), information associated with the provision of power to one or more external devices (e.g., arming and/or disarming event status), information associated with a home security system, information associated with one or more utility meters (e.g., a water meter, a gas meter) in communication with the power meter, and/or information associated with any number of identified events (e.g., power failure events, under voltage events, low voltage events, high voltage events, high frequency events, low frequency events, etc.). At least a portion of the collected and/or determined information may be presented to a user via one or more graphical user interfaces generated by the power meter.

Additionally, in various embodiments, the power meter may be configured to receive any number of user commands via one or more graphical user interfaces. In this regard, a user may direct the power meter to perform a wide variety of operations. For example, a user may direct the power meter to control the actuation of any number of load control relays. As another example, the user may direct the power meter to arm and/or disarm any number of devices and/or electrical loads, such as a security system, lights, a garage door, a dryer, etc. As yet another example, the user may direct the power meter to control gas and/or water inlet controls (e.g., shut-off valves associated with a gas and/or water meter). As yet another example, the user may establish or configure electrical power schedules for any number of devices.

Various embodiments of the invention may include one or more special purpose computers, systems, and/or particular machines that facilitate the provision of energy management services via a power meter. A special purpose computer or particular machine may include a wide variety of different software modules as desired in various embodiments. As explained in greater detail below, in certain embodiments, these various software components may be utilized to facilitate network communication between the power meter and one or more user devices, such as a personal computer or a mobile device. Additionally, these various software components may be utilized to provide energy management information to a user and/or to receive various user commands associated with controlling the operation of the power meter and/or external devices associated with the power meter.

Certain embodiments of the invention described herein may have the technical effect of providing energy management services and/or network-based user interfaces via a power meter. For example, a power meter may generate one or more graphical user interfaces, such as Web presentations, that facilitate the presentation of data to a user and/or the receipt of user commands for controlling the operation of the power meter and/or devices associated with the power meter. In this regard, the power meter may provide energy management services to a user and control power distribution based at least in part upon received user commands.

Figure 1:
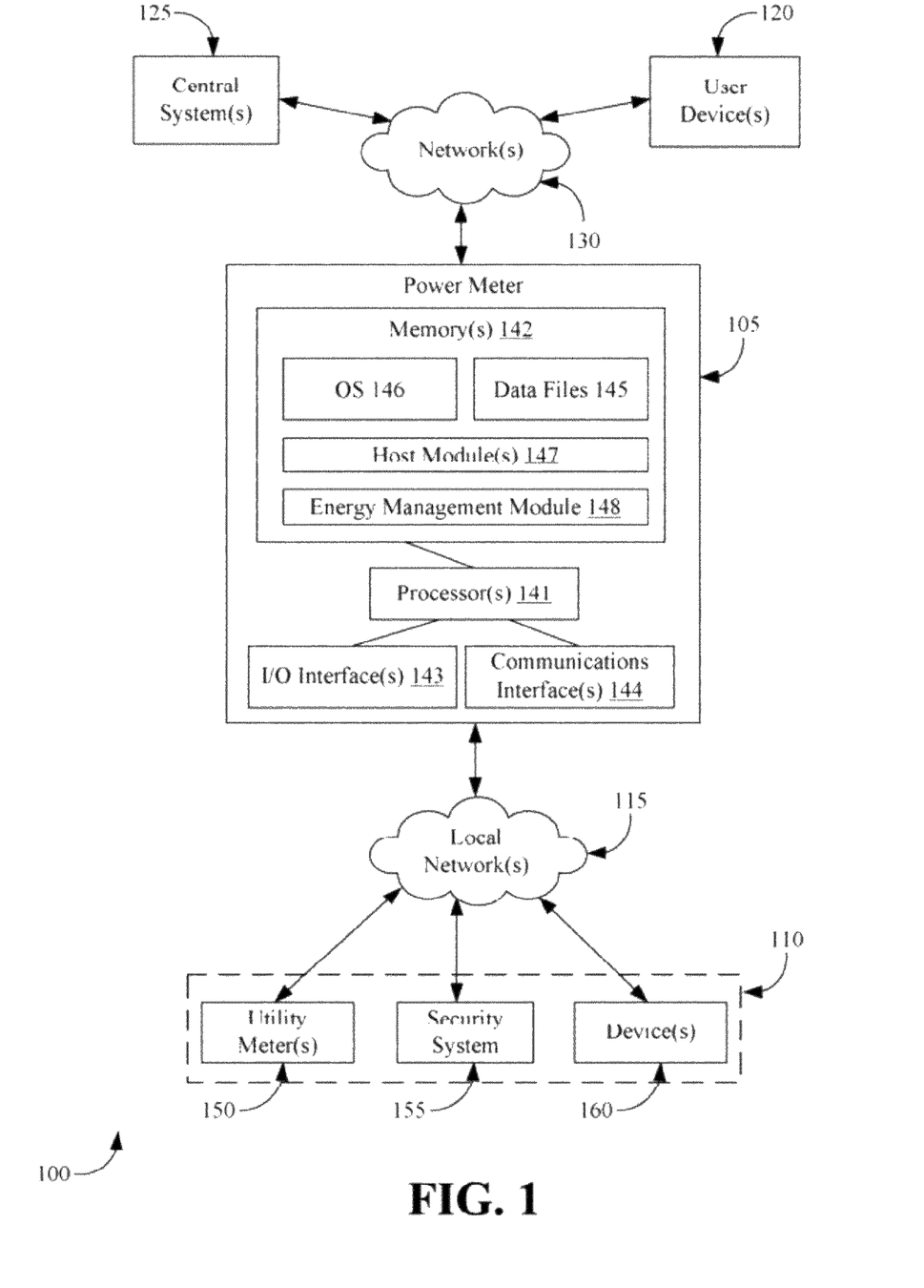
FIG. 1 is a block diagram of one example system that facilitates the provision of energy management services, according to an illustrative embodiment of the invention.

FIG. 1 is a block diagram of one example system 100 that facilitates the provision of energy management services, according to an illustrative embodiment of the invention. The system 100 illustrated in FIG. 1 may include a power meter 105 and one or more devices 110 in communication with the power meter 105 via one or more local networks 115 or home networks. Additionally, the system 100 may include any number of user devices 120 and/or a central system 125 in communication with the power meter 105 via one or more other networks 130, such as the Internet and/or an Advanced Metering Infrastructure ("AMI") network.

The power meter 105 may be any suitable power meter that may be connected to a distribution system or power distribution grid via any number of power lines. For purposes of this disclosure, a power meter 105 is described; however, other types of utility meters, such as a remote disconnect meter, a gas meter, and/or a water meter, may include similar functionality to that described for the power meter 105. A wide variety of suitable power meters may be utilized as desired in various embodiments, such as a single phase meter or a three-phase meter. The power meter 105 may be configured to measure an amount of electrical energy (e.g., kilowatt hours, etc.) or electrical power that is supplied to an associated location, residence, business, household, or machine. In certain embodiments, the power meter 105 may be a smart meter or an advanced meter that is configured to identify consumption in relatively greater detail than a conventional meter. For example, a smart power meter 105 may facilitate real-time or near real-time readings, power outage notification, and/or power quality monitoring. Additionally, as desired, a smart power meter 105 may communicate measurements data, calculations, and/or other information to one or more recipients, such as the central system 125.

According to an aspect of the invention, the power meter 105 may additionally facilitate the provision of energy management services. For example, the power meter 105 may be configured to collect, determine, and/or calculate information associated with the operation of the power meter 105 and/or the devices 110 associated with the power meter 105. Utilizing at least a portion of the information, the power meter 105 may generate one or more graphical user interfaces that illustrate operational and/or status information associated with the power meter 105 and/or any number of the devices 110. Following the establishment of a communications session (e.g., an Internet session, etc.) between the power meter 105 and a user device 120, the power meter 105 may communicate information associated with the one or more graphical user interfaces to the user device 120 for presentation to a user. In this regard, power company customers and/or other users may review energy management information and/or other information collected by the power meter 105. Additionally, the power meter 105 may be configured to receive user commands from a user device 120 via an established communications session. For example, a user may select options included in a graphical user interface and/or otherwise enter commands into a graphical user interface. The user commands may then be communicated to the power meter 105 and processed by the power meter 105. In this regard, operations of the power meter 105 and/or any number of the devices 110 may be controlled.

The power meter 105 may include any number of suitable computer processing components that facilitate the operation of the power meter, the provision of energy management services, and/or the communication of graphical user interface information. Examples of suitable processing devices that may be incorporated into the power meter 105 include, but are not limited to, application-specific circuits, microcontrollers, minicomputers, other computing devices, and the like. As such, the power meter 105 may include any number of processors 141 that facilitate the execution of computer-readable instructions. By executing computer-readable instructions, the power meter 105 may include or form a special purpose computer or particular machine that facilitates the provision of energy management services.

In addition to one or more processor(s) 141, the power meter 105 may include one or more memory devices 142, one or more input/output ("I/O") interfaces 143 and/or one or more communications and/or network interfaces 144. The one or more memory devices 142 or memories may include any suitable memory devices, for example, caches, read-only memory devices, random access memory devices, magnetic storage devices, etc. The one or more memory devices 142 may store data, executable instructions, and/or various program modules utilized by the power meter 105, for example, data files 145, an operating system ("OS") 146, one or more host modules 147, and/or an energy management module 148. The data files 145 may include any suitable data that facilitates the operation of the power meter 105 including, but not limited to, identification information for the power meter 105, measurements data taken by the power meter 105, load profile and/or usage information generated by the power meter 105, information received from one or more devices 110 associated with the power meter 105, status and/or alert information, power management and/or power distribution data, and/or information that facilitates communication with one or more other components of the system 100. The OS 146 may include executable instructions and/or program modules that facilitate and/or control the general operation of the power meter 105. Additionally, the OS 146 may facilitate the execution of other software programs and/or program modules by the processors 141, such as the host modules 147 and/or the energy management module 148.

The host modules 147 may be suitable software modules that facilitate communication with any number of external devices. Any number of host modules may be provided as desired in various embodiments of the invention. In one example embodiment, a host module 147 may facilitate the establishment of a communications session with a user device 120. For example, the host module 147 may provide server functionality that facilitates the establishment of a communications session (e.g., a wide area network session, an Internet session, etc.) between the power meter 105 and the user device 120. In this regard, information, such as graphical user interfaces, may be communicated to the user device 120. Additionally, user commands and/or requests may be received from the user device 120. As desired in certain embodiments, one or more host modules 147 may facilitate communication between the power meter 105 and any number of other devices 110. For example, one or more host modules 147 may facilitate the establishment of a communications session with one or more other devices 110 via any number of local networks 115. In this regard, data and/or alerts may be collected from the other devices 110. Additionally, various commands may be communicated from the power meter 105 to the other devices 110.

The energy management module 148 may be a suitable software module that is configured to provide any number of energy management and/or control services to a user. For example, the energy management module 148 may be configured to generate one or more graphical user interfaces, such as Web pages, that may be output for presentation to a user via a user device 120. These graphical user interfaces may facilitate the presentation of information to the user and/or the receipt of user commands. A wide variety of suitable graphical user interfaces may be generated as desired, such as informational interfaces and/or interfaces that facilitate the input and receipt of user commands. A few example interfaces are described in greater detail below with reference to FIGS. 4 and 5. In certain embodiments, the energy management module 148 may be incorporated into the power meter 105. In other embodiments, the energy management module 148 may be incorporated into another device or system in communication with the power meter 105.

In operation, the energy management module 148 may collect information associated with the status and/or operation of the power meter 105. A wide variety of information associated with the power meter 105 may be collected, determined, and/or calculated as desired in various embodiments of the invention, such as an age of the power meter 105, dates of usage for the power meter 105, identification information for the power meter 105 (e.g., manufacturing information, a serial number, a meter identification number, etc.), information associated with one or more environmental conditions associated with the power meter 105 (e.g., temperature, humidity, moisture content, etc.), status information for one or more physical buttons and/or input devices associated with the power meter 105 (e.g., a display or menu button, a test button, an arm button, etc.), phase information (e.g., phase voltage, phase current, etc.), phase load data, current power usage information, historical power usage information, power usage trends, load profile information, time of use information, accumulation information, prepaid metering data, status information for one or more load control relays, arming and/or disarming data for any number of other devices, and/or information associated with various alerts and/or notifications (e.g., power failure alerts, under voltage alerts, high voltage alerts, high frequency alerts, low frequency alerts, etc.). As desired, one or more suitable sensors associated with the power meter 105 (e.g., voltage sensors, current sensors, temperature sensors, etc.) may be utilized to collect information. Additionally, the energy management module 148 may collect information from other components of the power meter 105.

Additionally, the energy management module 148 may collect information from any number of other devices 110, such as status information, measurements data, utilization information, alerts, power data, arming data, and/or other information generated by the other devices 110. In certain embodiments, one or more communications or network interfaces 144 associated with the power meter 105, such as a Home Area Network ("HAN") interface, a ZigBee interface and/or ZigBee adaptor, a radio frequency ("RF") interface, a serial communication link interface, a local area network interface, a Wi-Fi interface, and/or a wired interface, may receive data from the other devices 110 via any number of local networks or home networks 115. The received data may then be provided to the energy management module 148 either directly or via another suitable module, such as a host module 147.

The energy management module 148 may be configured to generate and/or format any number of messages and/or graphical user interfaces associated with the collected and/or determined data. For example, various usage and/or reporting messages may be generated for communication to the central system 125. As another example, various graphical user interfaces may be generated for communication to any number of user devices 120. For example, once a communications session (e.g., an Internet communications session, etc.) has been established between the power meter 105 and a user device 120, the energy management module 148 may generate any number of graphical user interfaces (e.g., Web pages, etc.) that may be utilized to present information to the user and/or to receive user commands. Once generated, the energy management module 148 may direct the communication of information associated with a graphical user interface to a user device 120 for presentation to the user. For example, the energy management module 148 may direct a host module 147 to communicate graphical user interface information to a user device 120 via a suitable network 130, such as a suitable local area network or wide area network (e.g., the Internet) that facilitates communication with the user device 120.

Additionally, in certain embodiments, the energy management module 148 may direct the power meter 105 to generate and/or output one or more presentations and/or alerts via I/O devices associated with the power meter 105. For example, the energy management module 148 may direct the power meter 105 to output information utilizing any number of associated output devices, such as a speaker, one or more light emitting diodes ("LEDs"), a LED display, a liquid crystal display ("LCD"), a controller display unit, a human machine interface, an in-home display, a central display unit, etc.

In certain embodiments, the energy management module 148 may additionally be configured to control the operation of one or more other devices 110 and/or the provision of electric power to any number of other devices 110 and/or areas associated with a household or other location. For example, the energy management module 148 may receive user commands associated with the provision of power to any number of electrical loads (e.g., electrical appliances, lights, air conditioners, grinders, fans, etc.), and the energy management module 148 may process the received commands to facilitate the provision of electrical power. As another example, the energy management module 148 may receive user commands associated with controlling the operation of one or more other devices 110, and the energy management module 148 may process the received commands and direct various operations associated with the other devices 110. For example, the energy management module 148 may receive a command to open or close a gas or water inlet, and the energy management module 148 may direct an associated gas meter or water meter to open or close the inlet in order to allow or stop the flow of gas or water. As yet another example, the energy management module 148 may receive a user command to arm or disarm a security system and/or various components of the security system (e.g., motion detectors, cameras, etc.), and the energy management module 148 may process the received command and communicate suitable control messages to the security system and/or to the security system components. Indeed, a wide variety of different types of user commands may be received and processed by the energy management module 148.

A wide variety of different types of commands may be received by the energy management module 148. A few example commands may include instantaneous commands, delayed commands, and/or conditional commands. Instantaneous commands may be commands that are processed and executed upon receipt. For example, a user may direct the energy management module 148 to turn on certain lights inside a home. Delayed commands may be commands that are executed at a subsequent point of time, such as a time included in the command or a time calculated based upon the command. For example, a user may direct the energy management module 148 to turn on an air conditioner at seven o'clock p.m. Conditional commands are commands that are executed based upon the satisfaction of one or more predetermined parameters. For example, a user may direct the energy management module 148 to run a dryer or other appliance when the cost of electricity is at or below a defined value. Once the cost of electricity satisfies the cost parameter, the energy management module 148 may provide power to the dryer and/or direct the dryer to run.

In certain embodiments, the energy management module 148 and the power meter 105 may host smart grid home energy management software that facilitates the presentation of energy management information to a user and/or the receipt and processing of energy management commands. For example, the graphical user interfaces may facilitate the presentation of information to the user and the receipt of user commands. Based upon received user commands, operation of the power meter 105 and/or the other devices 110 may be controlled. Additionally, the distribution of electrical power to the other devices 110 may be managed. In this regard, a user may track energy spending and/or achieve energy cost savings. One example of the operations of the energy management module 148 is described in greater detail below with reference to FIGS. 2-3.

With continued reference to the power meter 105, the one or more I/O interfaces 143 may facilitate communication with any number of suitable input/output devices, such as one or more physical buttons, a display, a keypad, a control panel, a touch screen display, a remote control, etc., that facilitate user interaction with the power meter 105. In this regard, user commands may be locally received by the power meter 105. Additionally, information may be displayed and/or otherwise output to a user.

The one or more communications or network interfaces 144 may facilitate connection of the power meter 105 to any number of suitable networks, such as the local or home network(s) 115 and the network(s) 130 that facilitate communication with user devices 120 and/or the central system 125. In this regard, the power meter 105 may receive data from and/or communicate data to other components of the system 100. As desired, the power meter 105 may additionally include any number of network cards and/or network interface devices that facilitate communication with the various networks 115, 130. For example, a ZigBee adaptor, a radio frequency ("RF") transceiver, a Wi-Fi transceiver, or other suitable device may facilitate connection of the power meter 105 to a local area network or home network 115. As desired, a device that facilitates local network communication may also facilitate communication with a user device 120. Additionally, the power meter 105 may include any number of network cards and/or communications devices that facilitate communication with any number of wide area networks 130, such as the Internet, an AMI network, and/or a cellular network. In one embodiment, the power meter 105 may include a suitable Internet-enabled network card or board, such as a Silver Spring Network ("SSN") board, that facilitates connection of the power meter 105 to a wide area network. In certain embodiments, the Internet-enabled network card may permit the power meter 105 to establish an Internet Protocol ("IP") address that allows other devices to access the power meter 105 and/or establish a communications session with the power meter 105. Other examples of network cards and/or communications devices that may be included in the power meter 105 include an AMI board, a Global System for Mobile Communications ("GSM") transceiver, a General Packet Radio Service ("GPRS") transceiver, another cellular communications device, a Broadband over Power Lines ("BPL") adaptor, any number of Ethernet cards, etc.

The power meter 105 may typically receive power from a connected power grid and/or power line. Additionally, as desired in certain embodiments, the power meter 105 may include any number of suitable back-up power supplies, such as one or more batteries and/or one or more super capacitors. In the event of a power failure, the batteries or other power supplies may provide power to the power meter 105. Additionally, the energy management module 148 may be configured to detect a loss of power event, and the energy management module 148 may be configured to generate one or more messages, alerts and/or notifications associated with the loss of power.

Additionally, the power meter 105 may include any number of load control relays. The load control relays may facilitate the provision of electrical power by the power meter 105 to respective electrical loads connected to or downstream from the load control relays. In this regard, the provision of power to equipment connected to the load control relays may be controlled by the power meter 105. Examples of suitable load control relays include, but are not limited to, two amp load control relays and/or forty amp load control relays.

With continued reference to FIG. 1, the system 100 may include any number of devices 110, such as local devices, that are in communication with or otherwise associated with the power meter 105. For example, one or more other utility meters 150 may be provided, such as a gas meter and/or a water meter. These meters 150 may monitor and/or control the provision of services, such as water and/or gas services. Measurements data and/or operational data may be collected by these meters 150 and communicated to the power meter 105. As another example, any number of security systems 155 and/or security devices may be provided. The security systems 155 and/or security devices may be configured to collect security monitoring data and provide at least a portion of the security monitoring data to the power meter 105 via the one or more local networks 115. A wide variety of different types of security devices may be in direct or indirect communication with the power meter 105. These security devices include, but are not limited to, intrusion and property protection devices, presence detection sensors, motion sensors, security cameras, access control devices (e.g., electronic locks, key card access devices, etc.), smoke detectors, carbon monoxide detectors, mechanical safety switches, machine guarding devices, contact switches, vibration sensors, digital security modules, home security systems (e.g., security panels, etc.), and/or other devices.

As yet another example, any number of other types of devices 160 may be provided. These devices 160 may include any number of electrical appliances and/or electrical loads (e.g., an air conditioner, a dryer, lights, etc.) Additionally, these devices 160 may include any number of suitable load relays or switches that are situated outside of the power meter 105. These load control relays may be similar to the internal load control relays described above. In certain embodiments, the devices 160 may include an energy management system (e.g., smart circuit breaker, etc.) that is situated external to the power meter 105.

In certain embodiments, one or more other devices 110 may be in direct communication with the power meter 105 via the local networks 115. In other embodiments, one or more other devices 110 may communicate with one or more intermediate devices via one or more wired or wireless connections, and the intermediate devices may communicate with the power meter 105. As desired, the other devices 110 may be suitable processor-driven devices that facilitate collection of monitoring data and/or operational data that may be communicated to the power meter 105 and/or the receipt of commands from the power meter 105. As such, any number of other devices 110 may include any number of processors, memory devices, and/or communications interfaces. These components may be similar to those described above with reference to the power meter 105.

The one or more local networks 115 may include any number of suitable networks that facilitate communication between the power meter 105 and/or other components of the system 100, such as the other devices 110. Examples of suitable local networks 115 include, but are not limited to, a Home Area Network ("HAN"), a ZigBee specification wireless personal area network, a radio frequency ("RF") network, a Bluetooth™ enabled network (trademark owned by BLUETOOTH SIG, INC.), any suitable wireless network, and/or any suitable wired network.

With continued reference to FIG. 1, one or more central systems 125 may be in communication with the power meter 105. A central system 125 may be a central system provided by or associated with a power company or other utility. As such, the central system 125 may include any number of processor-driven devices that facilitate the receipt and processing of messages and/or collected data. For example, the central system 125 may include any number of personal computing devices, server computers, and/or other computing devices. A computing device associated with the central system 125 may include any number of processors, memory devices, and/or communications interfaces. These components may be similar to those described above with reference to the power meter 105. In operation, the central system 125 may receive and process messages and/or data output by the power meter 105. For example, the central system 125 may collect power consumption data, usage data, alerts for power failure events, alerts associated with abnormal conditions (e.g., voltage conditions, current conditions, frequency conditions, etc.). Additionally, in certain embodiments, the central system 125 may host communications sessions in a similar manner as that described above for the power meter 105. For example, the central system 125 may include a suitable Web server that outputs graphical user interfaces to user devices 120 and/or receives user commands. Based upon received user commands, the central system 125 may output various commands to relevant power meters 105 via any number of suitable networks 130, such as an AMI network and/or a cellular network.

With continued reference to FIG. 1, one or more user devices 120 may be in communication with the power meter 105. Any number of user devices 120 may be utilized as desired in various embodiments, such as mobile devices, personal digital assistants, personal computers, etc. A user device 120 may include any number of processor-driven devices that facilitate communication with the power meter 105, the receipt of presentation information output by the power meter 105, and/or the communication of user commands to the power meter 105. As such, a user device 120 may include any number of processors, memory devices, and/or communications interfaces. These components may be similar to those described above with reference to the power meter 105. In operation, a user device 120 may be configured to request the establishment of a communications session (e.g., an Internet communications session) with the power meter 105. For example, an IP address associated with the power meter 105 may be accessed. Once a communications session has been established, the user device 120 may receive information associated with one or more graphical user interfaces (e.g., Web pages) and/or other presentations from the power meter 105, and the user device 120 may format the received information and present at least a portion of the received information to a user. Additionally, the user device 120 may be configured to receive commands from a user (e.g., a command to provide power to an electrical load, a command to activate a security system, a command to allow gas and/or water flow, etc.) and communicate received commands to the power meter 105.

One or more wide area networks 130 may facilitate communication between the power meter 105, central system 125, and/or user devices 120. A wide variety of suitable wide area networks 130 may be utilized as desired in various embodiments of the invention, such as, the Internet, a cellular network, a satellite-based network, or any other suitable wide area network.

As desired, embodiments of the invention may include a system 100 with more or less than the components illustrated in FIG. 1. Additionally, certain components of the system 100 may be combined in various embodiments of the invention. The system 100 of FIG. 1 is provided by way of example only.

Figure 2:
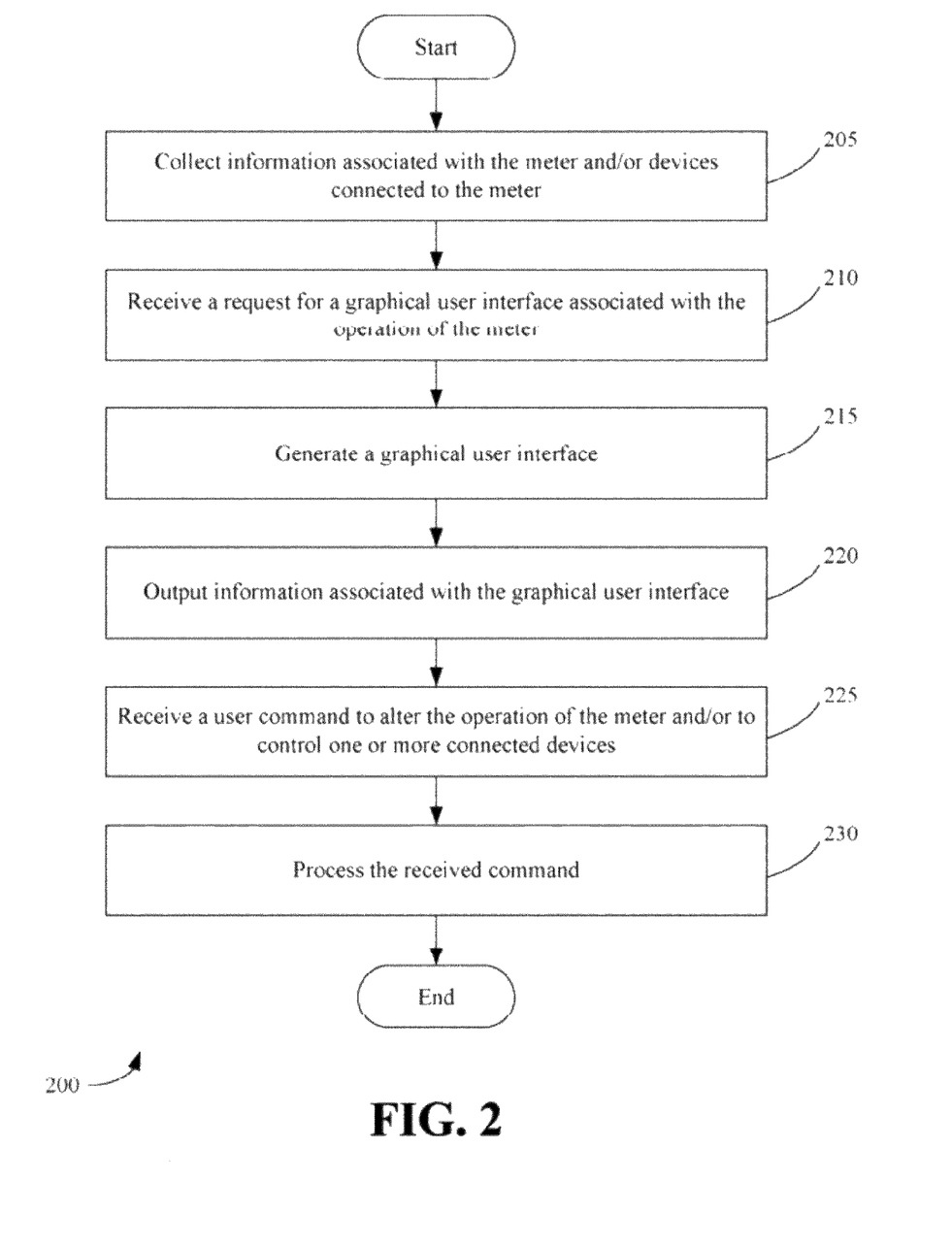
FIG. 2 is a flow diagram of an example method for providing energy management utilizing a smart power meter, according to an illustrative embodiment of the invention.

FIG. 2 is a flow diagram of an example method 200 for providing energy management utilizing a smart power meter, according to an illustrative embodiment of the invention. The method 200 may be utilized in association with one or more energy management systems, such as the system 100 illustrated in FIG. 1. In certain embodiments, the operations of the method 200 may be performed by a suitable energy management module incorporated into and/or in communication with a power meter, such as the energy management module 148 associated with the power meter 105 of FIG. 1.

The method 200 may begin at block 205. At block 205, information associated with the power meter 105 and/or any number of devices connected to the power meter 105, such as the devices 110 illustrated in FIG. 1, may be collected, calculated and/or otherwise determined. A wide variety of information associated with the power meter 105 may be collected, determined, and/or calculated as desired in various embodiments of the invention, such as an age of the power meter 105, dates of usage for the power meter 105, identification information for the power meter 105 (e.g., manufacturing information, a serial number, a meter identification number, etc.), information associated with one or more environmental conditions associated with the power meter 105 (e.g., temperature, humidity, moisture content, etc.), status information for one or more physical buttons and/or input devices associated with the power meter 105 (e.g., a display or menu button, a test button, an arm button, etc.), phase information (e.g., phase voltage, phase current, etc.), phase load data, current power usage information, historical power usage information, power usage trends, load profile information, time of use information, accumulation information, prepaid metering data, status information for one or more load control relays, arming and/or disarming data for any number of other devices, and/or information associated with various alerts and/or notifications (e.g., power failure alerts, under voltage alerts, high voltage alerts, high frequency alerts, low frequency alerts, etc.). Additionally, a wide variety of information associated with the other devices 110 may be collected, calculated, and/or determined, such as status information, measurements data, utilization information, alerts, power data, and/or arming data.

At block 210, a request for one or more graphical user interfaces (e.g., Web sites) associated with operation of the power meter 105 may be received. For example, a user may utilize a suitable user device, such as the user device 120 illustrated in FIG. 1, to access an IP address or other network location associated with the power meter 105, and a communications session may be established between the power meter 105 and the user device 110. Either in conjunction with a request to establish a communications session or following the establishment of the communications session, a user request for a graphical user interface may be communicated by the user device 120 to the power meter 105.

At block 215, one or more graphical user interfaces and/or information associated with the graphical user interfaces may be generated by the power meter 105 based at least in part on the received request. The generated interface(s) may include information associated with the operation of the power meter 105 and/or information that facilitates the input and/or receipt of user commands. At block 220, information associated with the graphical user interface(s) may be output by the power meter 105 for communication to the user device 120 via any number of suitable networks, such as the networks 130 described above with reference to FIG. 1. A wide variety of different types of graphical user interfaces may be generated by the power meter 105 as desired in various embodiments of the invention. A few example interfaces are described in greater detail below with reference to FIGS. 4-5.

At block 225, one or more user commands to alter the operation of the power meter 105 and/or to control one or more other devices 110 may be received. For example, a user command may be selected and/or entered by the user utilizing one or more graphical user interfaces that have been presented to the user. Once entered, a command may be communicated by the user device 120 to the power meter 105. For example, a command may be communicated via a communications session that has been established between the user device 120 and the power meter 105. At block 230, the received user commands and/or requests may be processed by the power meter 105. A wide variety of different types of user commands may be received and/or processed as desired in various embodiments of the invention, such as commands to alter the operation of one or more load control relays, commands to control inlet controls associated with gas and/or water flow, commands to arm and/or disarm security devices and/or a security system, and/or commands to control the provision of power to any number of electrical loads. A few example commands and/or types of commands are described in greater detail below with reference to FIG. 3.

The method 200 of FIG. 2 may end following block 230. Alternatively, as desired, the operations of the method 200 may be continuously performed in a repeating loop.

Figure 3:
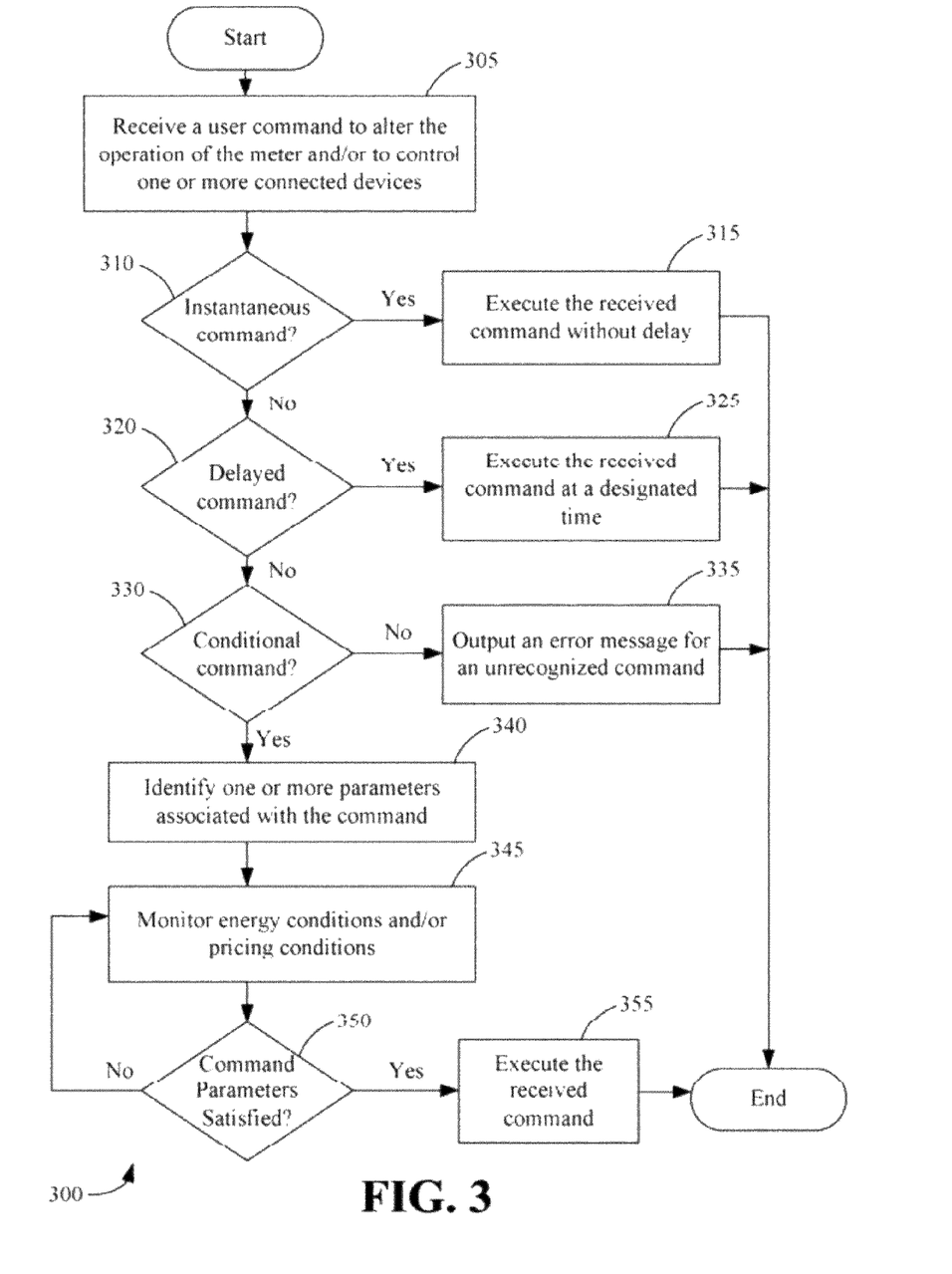
FIG. 3 is a flow diagram of an example method for processing user commands by a smart power meter, according to an illustrative embodiment of the invention.

FIG. 3 is a flow diagram of an example method 300 for processing user commands by a smart power meter, according to an illustrative embodiment of the invention. The method 300 may be utilized in association with one or more energy management systems, such as the system 100 illustrated in FIG. 1. In certain embodiments, the method 300 may be an example of the operations that may be performed at blocks 225 and 230 of FIG. 2. As such, the operations of the method 300 may be performed by a suitable energy management module incorporated into and/or in communication with a power meter, such as the energy management module 148 associated with the power meter 105 of FIG. 1.

The method 300 may begin at block 305. At block 305, a user command to alter the operation of the power meter 105 and/or to control one or more other devices, such as the devices 110 illustrated in FIG. 1, may be received by the power meter 105. For example, a user command may be selected and/or entered by the user utilizing one or more graphical user interfaces that have been presented to the user. Once entered, a command may be communicated by a user device, such as the user device 120 illustrated in FIG. 1, to the power meter 105. For example, a command may be communicated via a communications session that has been established between the user device 120 and the power meter 105. A wide variety of different types of user commands may be received and/or processed as desired in various embodiments of the invention, such as commands to alter the operation of one or more load control relays, commands to control inlet controls associated with gas and/or water flow, commands to arm and/or disarm security devices and/or a security system, and/or commands to control the provision of power to any number of electrical loads.

At block 310, a determination may be made as to whether the received command is an instantaneous command. In other words, a determination may be made as to whether the command is a command to take an immediate action, such as a command to immediately arm a security system, control the supply of water and/or gas, actuate a load control relay, or provide power to an electrical load (e.g., lights, electrical appliances, etc.). If it is determined at block 310 that the command is an instantaneous command, then operations may continue at block 315, and the received command may be executed by the power meter 105 without delay. A wide variety of suitable control actions may be taken by the power meter 105 to execute the command. For example, one or more load control relays may be actuated and/or one or more suitable command messages may be communicated by the power meter 105 to the other devices 110. In this regard, the power meter 105 may change the state of various devices from "on" to "off" and vice versa. Similarly, the power meter 105 may change the state of various devices from "opened" to "closed" and vice versa. Additionally, the power meter 105 may adjust settings associated with various devices. For example, the power meter 105 may adjust a thermostat control for an air conditioner or heater.

If, however, it is determined at block 310 that the received command is not an instantaneous command, then operations may continue at block 320. At block 320, a determination may be made as to whether the received command is a delayed command. For example, a determination may be made as to whether the received command is a command to take an action after a predetermined period of time has elapsed or a command to take an action at a specified subsequent point in time. Examples of suitable delayed commands may include commands to turn on exterior lights ten hours in the future and/or commands to turn on an air conditioner or adjust the settings of an air conditioner at a particular time. If it is determined at block 320 that the received command is a delayed command, then operations may continue at block 325. At block 325, the power meter 105 may determine a designated time at which the command should be executed, and the power meter 105 may execute the command at the designated time. Similar to the instantaneous command described above, the power meter 105 may take any number of suitable control actions to execute the command.

If, however, it is determined at block 320 that the received command is not a delayed command, then operations may continue at block 330. At block 330, a determination may be made as to whether the received command is a conditional command or an optimum/profile based command. A conditional command may be a command that instructs the power meter 105 to take a designated action based upon the identification of designated conditions, such as relatively low price conditions for electricity. For example, a conditional command may include a command to activate one or more electrical loads or devices (e.g., water pumps, a dryer, etc.) during conditions in which electrical power costs are at or below a designated optimum value. If it is determined at block 330 that the received command is not a conditional command, then operations may continue at block 335. At block 335, which may be optional in certain embodiments, it may be determined that the command is not recognized as a valid or recognized command, and an appropriate error message may be generated and output by the power meter 105.

If, however, it is determined at block 330 that the received command is a conditional command, then operations may continue at block 340. At block 340, one or more parameters associated with the command may be identified. A wide variety of parameters may be identified as desired in various embodiments of the invention, such as electricity pricing parameters (e.g., desired price for executing the command), timing parameters, and/or other parameters.

At block 345, the power meter 105 may monitor any number of energy conditions and/or pricing conditions. For example, the power meter 105 may monitor power demand conditions and current pricing information for electricity. As desired, pricing information may be periodically and/or continuously obtained by the power meter 105 from one or more external devices, such as the central system 125 illustrated in FIG. 1. At block 350, a determination may be made as to whether the one or more parameters associated with the conditional command, such as pricing parameters (and other parameters), have been satisfied. For example, a determination may be made as to whether a current price of electricity satisfies a designated price condition for executing the command. If it is determined at block 350 that the command parameters have not, been satisfied, then operations may continue at block 345, and the energy conditions and/or pricing conditions may continue to be monitored.

If, however, it is determined at block 350 that the command parameters have been satisfied, then operations may continue at block 355. At block 355, the power meter 105 may execute the received conditional command. Similar to the instantaneous command described above, the power meter 105 may take any number of suitable control actions to execute the command.

The method 300 of FIG. 3 may end following either of blocks 315, 325, 335, or 355.

The operations described and shown in the methods 200, 300 of FIGS. 2-3 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-3 may be performed. As desired, the operations set forth in one or more of the methods 200, 300 may be performed in a loop as a location is monitored by a power meter.

Figure 4:
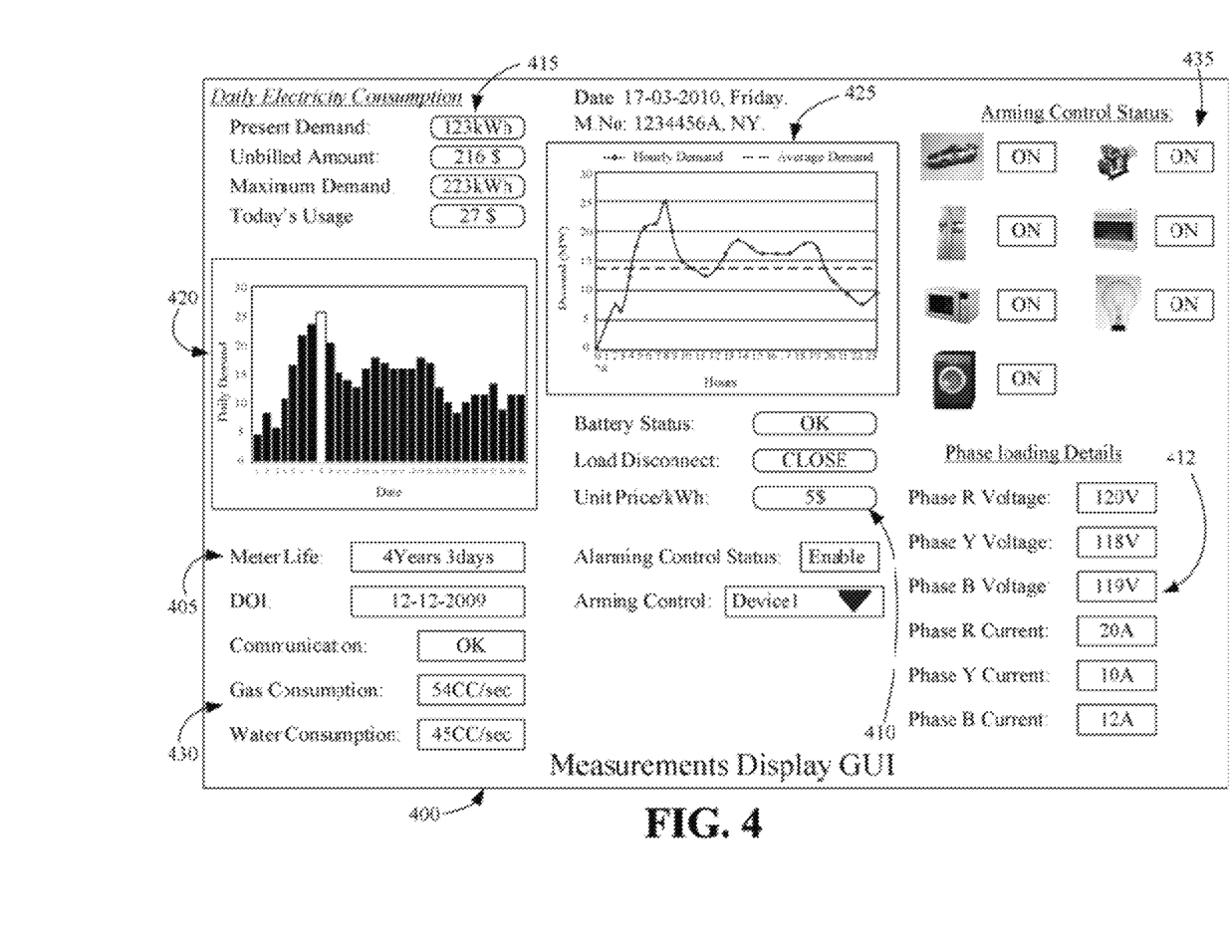
FIG. 4 is an example graphical user interface that may be generated by a smart power meter to present information associated with an operation of the smart power meter.
Figure 5:
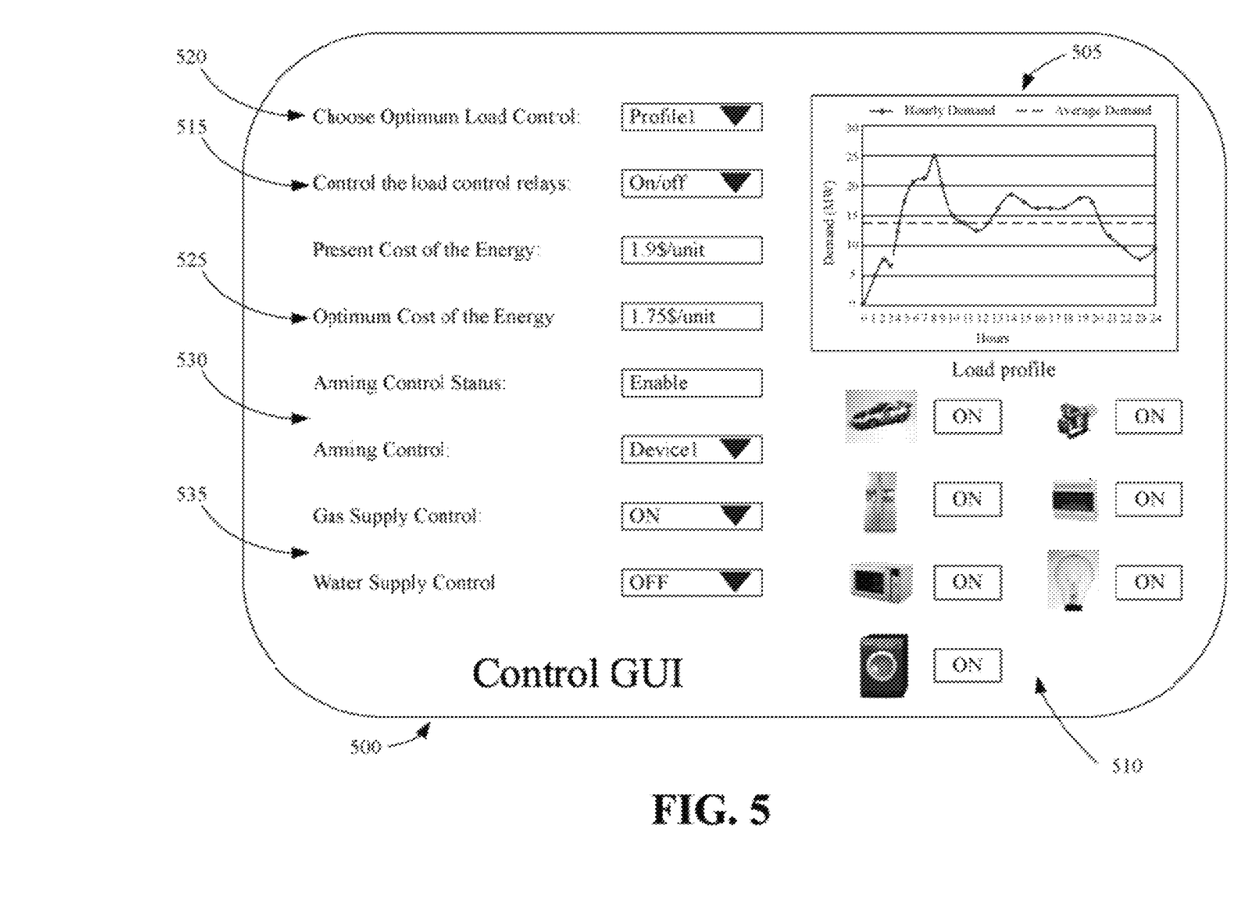
FIG. 5 is an example graphical user interface that may be generated by a smart power meter to facilitate the receipt of user commands associated with an operation of the smart power meter.

Any number of graphical user interfaces may be generated by a power meter, such as the power meter 105 illustrated in FIG. 1, and output for communication to a user device, such as a personal computer or mobile device. FIGS. 4 and 5 are examples of suitable graphical user interfaces that may be generated. FIG. 4 is an example graphical user interface 400 that may be generated by a power meter 105 to present information associated with an operation of the power meter 105.

With reference to FIG. 4, a wide variety of different types of information may be illustrated. For example, energy meter data information 405, such as meter life information and a date of install, may be illustrated. As another example, status information and/or meter identification information (e.g., a meter serial number, etc.) may be illustrated. As shown, a battery status, communication status information, and/or information associated with one or more load control relays (e.g., a load disconnect relay) may be illustrated. Additionally, a current price 410 of electricity may be illustrated. As desired, a wide variety of phase loading details 412 may also be provided, such as voltage and/or current measurements for one or more power phases that are connected to the power meter 105. In certain embodiments, frequency conditions may also be displayed.

Additionally, a wide variety of demand and/or usage information 415 may be illustrated as desired in various embodiments. For example, a present electricity demand, an unbilled amount for consumed electricity, a maximum demand, and/or a daily usage may be illustrated. Additionally, any number of graphical illustrations and/or trends may be illustrated, such as a chart 420 that tracks daily power consumption over a given period (e.g., a thirty-day period) and/or a chart 425 that tracks power usage over a given day (e.g., the previous twenty-four hours, etc.).

With continued reference to FIG. 4, information 430 associated with any number of other utility meters that are in communication with the power meter 105 may be illustrated. For example, gas consumption and/or water consumption information may be illustrated. Additionally, information 435 associated with the arming status of any number of electrical loads and/or devices (e.g., lights, generators, electrical appliances, etc.) may be illustrated. In this regard, a user may quickly determine the devices to which power is being supplied.

FIG. 5 is an example graphical user interface 500 that may be generated by a power meter 105 to facilitate the receipt of user commands associated with an operation of the power meter 105. FIG. 5 may be presented to a user based upon the receipt of a user command for the interface 500 and/or based upon the receipt of an indication that the user would like to alter operation of the power meter 105 and/or any number of associated devices 110. As an alternative to utilizing a dedicated interface 500 to receive user commands, any number of selectable indicators and/or command options may be provided in an information interface, such as the interface 400 illustrated in FIG. 4.

With reference to FIG. 5, any suitable informational data may be illustrated in the interface 500, such as a chart 505 that tracks electricity demand (e.g., a chart that tracks demand over the previous twenty-four hours), status information 510 for any number of loads and/or devices controlled by the power meter 105 (e.g., information indicating whether power is supplied to various electrical loads), and/or a current price or cost of electrical energy. As desired, toggle switches or buttons may be provided for the various loads and/or devices. In this regard, a user may instruct the power meter 105 to supply power to designated devices and/or to cease the provision of power to designated devices.

Additionally, any number of selectable options, indicators, drop down menus, and/or data entry fields may be provided in order to facilitate the receipt of various user commands. For example, one or more load control relay options 515 may be provided. The load control relay options 515 may allow a user to control the actuation of any number of load control relays incorporated into the power meter 105 and/or controlled by the power meter 105. In this regard, the user may control the provision of electrical power to any number of electrical loads associated with the load control relays.

With continued reference to FIG. 5, a load control profile option 520 may be provided. The profile option 520 may allow a user to select a predetermined user load profile or a default profile. Additionally, the profile option 520 may allow a user to establish a new load profile. A load profile may include settings for automatically controlling the operation of any number of other devices, such as other utility meters, load control relays, and/or electrical loads. For example, a load profile may include date and time information for providing power to other devices (e.g., turning on lights, running a dishwasher) and/or controlling the operation of other devices (e.g., altering thermostat settings, shutting off water and/or gas flow, etc.). Indeed, a wide variety of different settings may be established utilizing a load profile.

With continued reference to FIG. 5, a field 525 may be provided that permits the user to establish an optimum energy cost. As desired, a default cost, such as a non-peak cost, may be determined and provided to the user; however, the user may edit the default cost. The establishment of an optimum energy cost may allow the user to specify pricing conditions under which various actions, such as the powering of various electrical loads, should be taken.

Additionally, one or more arming control options 530 may be provided by the interface 500. For example, a pull down menu that allows a user to select a security device or other device may be provided along with a toggle switch or toggle button that allows a user to enable or disable the selected device. In this regard, a user may arm or disarm a security system and/or any number of individual security devices (e.g., motion sensors, cameras, etc.).

In certain embodiments, one or more utility control switches 535 may also be provided. These switches 535 may allow the user to control the supply of gas, water, and/or other utilities to the user's household or other location. For example, the user may control inlet control valves to cut off and/or allow gas and/or water to be provided. Based upon user input received via the utility control switches 535, the power meter 105 may instruct other utility meters to take any number of control actions.

The interfaces 400, 500 illustrated in FIGS. 4 and 5 are provided by way of example only. As desired, less than or more than the information illustrated in the interfaces 400, 500 may be incorporated into a graphical user interface that is provided to a user. In this regard, a wide variety of information may be presented to a user and/or a wide variety of different types of commands may be received.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method comprising:
   receiving, by a power meter in communication with an external device, a request for a graphical user interface associated with at least one of (i) operation of the power meter or (ii) provision of electrical power to one or more loads;
   generating, by the power meter based at least in part on the received request, information associated with the graphical user interface;
   communicating, by the power meter to the external device, the generated information associated with the graphical user interface; and
   collecting information associated with at least one of (i) the operation of the power meter or (ii) one or more devices connected to the power meter, wherein at least a portion of the collected information is utilized to generate the information associated with the graphical user interface, wherein collecting information comprises collecting at least one of (i) an age of the power meter, (ii) identification information for the power meter, (iii) information associated with one or more environmental conditions, (iv) status information for one or more buttons associated with the power meter, (v) phase loading information associated with the power meter, (vi) status information for one or more load control relays, (vii) information associated with an operation of a utility meter in communication with the power meter, (viii) information associated with an electrical load profile, or (ix) information associated with provision of power to one or more external loads.

2. The method of claim 1, wherein receiving a request comprises receiving a request via the Internet.

3. The method of claim 1, wherein collecting information comprises collecting information via at least one of (i) a Home Area Network (HAN) interface, (ii) a ZigBee interface, (iii) a radio frequency (RF) interface, (iv) a local area network (LAN) interface, or (v) a Wi-Fi interface.

4. The method of claim 1, further comprising:
   receiving, by the power meter from the external device, a command to alter one of (i) the operation of the power meter or (ii) the provision of electrical power; and
   processing, by the power meter, the received command.

5. The method of claim 4, wherein receiving a command comprises receiving one of (i) a command to control one or more load control relays associated with the power meter, (ii) a command to control the operation of a utility meter in communication with the power meter, or (iii) a command to control the provision of electrical power to one or more external loads.

6. The method of claim 4, wherein:
   receiving a command comprises receiving a command to take an instantaneous action, and
      wherein processing the received command comprises processing the received command upon receipt of the command.

7. The method of claim 4, wherein receiving a command comprises receiving a command to take a delayed action, and further comprising:
   determining, by the power meter based at least in part upon the received command, a point in time at which the command should be processed,
   wherein processing the received command comprises processing the received command once the determined point in time has been reached.

8. The method of claim 4, wherein receiving a command comprises receiving a conditional command, and further comprising:
   identifying, by the power meter based at least in part upon the received command, one or more energy pricing parameters associated with the command; and
   determining, by the power meter, that the one or more parameters have been satisfied,
   wherein processing the received command comprises processing the received command based upon the determination that the one or more parameters have been satisfied in order to alter the provision of electrical power to one or more electrical loads associated with the command.

9. A power meter, comprising:
at least one memory configured to store computer-executable instructions; and
at least one processor configured to access the at least one memory and execute the computer-executable instructions to:
receive, from an external device, a request for a graphical user interface associated with at least one of (i) operation of the power meter or (ii) provision of electrical power to one or more loads;
generate, based at least in part on the received request, information associated with the graphical user interface;
direct communication of the generated information to the external device; and
collect information associated with at least one of (i) the operation of the power meter or (ii) one or more devices connected to the power meter, wherein at least a portion of the collected information is utilized to generate the information associated with the graphical user interface, wherein the collected information comprises at least one of (i) an age of the power meter, (ii) identification information for the power meter, (iii) information associated with one or more environmental conditions, (iv) status information for one or more buttons associated with the power meter, (v) phase loading information associated with the power meter, (vi) status information for one or more load control relays, (vii) information associated with an operation of a utility meter in communication with the power meter, (viii) information associated with an electrical load profile, or (ix) information associated with provision of power to one or more external loads.

10. The power meter of claim 9, further comprising:
at least one communications interface configured to receive the request via the Internet.

11. The power meter of claim 9, wherein the collected information is collected via at least one of (i) a Home Area Network (HAN) interface or (ii) a ZigBee interface, (iii) a radio frequency (RF) interface, (iv) a local area network (LAN) interface, or (v) a Wi-Fi interface.

12. The power meter of claim 9, wherein the at least one processor is further configured to execute the computer-executable instructions to:
receive, from the external device, a command to alter one of (i) the operation of the power meter or (ii) the provision of electrical power; and
process the received command.

13. The power meter of claim 12, wherein the received command comprises one of (i) a command to control one or more load control relays associated with the power meter, (ii) a command to control the operation of a utility meter in communication with the power meter, or (iii) a command to control the provision of electrical power to one or more external loads.

14. The power meter of claim 12, wherein:
the received command comprises a command to take an instantaneous action, and
the at least one processor is configured to process the received command upon receipt of the command.

15. The power meter of claim 12, wherein:
the received command comprises a command to take a delayed action, and
the at least one processor is further configured to execute the computer-executable instructions to:
determine, based at least in part upon the received command, a point in time at which the command should be processed; and
process the received command once the determined point in time has been reached.

16. The power meter of claim 12, wherein:
the received command comprises a conditional command, and
the at least one processor is further configured to execute the computer-executable instructions to:
identify, based at least in part upon the received command, one or more energy pricing parameters associated with the command;
determine that the one or more parameters have been satisfied; and
process the received command based upon the determination that the one or more parameters have been satisfied in order to alter the provision of electrical power to one or more electrical loads associated with the command.

* * * * *